United States Patent [19]

Koue et al.

[11] Patent Number: 5,438,432
[45] Date of Patent: Aug. 1, 1995

[54] DATA TRANSMITTING APPARATUS

[75] Inventors: Toshiaki Koue; Tsunehiro Matsui, both of Saitama, Japan

[73] Assignee: Fuji Xerox Co., Ltd., Tokyo, Japan

[21] Appl. No.: 950,154

[22] Filed: Sep. 24, 1992

[30] Foreign Application Priority Data

Sep. 25, 1991 [JP] Japan .................. 3-271898

[51] Int. Cl.$^6$ .............................................. H04N 1/00
[52] U.S. Cl. ................................... 358/467; 358/448
[58] Field of Search ............... 358/260, 261, 467, 294, 358/298, 283, 287, 434, 443, 494, 715; 364/518, 519, 200, 225.6; 382/22, 30, 50, 11; 369/32, 33, 34, 43, 41, 47; 395/146, 155, 162

[56] References Cited

U.S. PATENT DOCUMENTS

| | | | |
|---|---|---|---|
| 4,642,698 | 2/1987 | Yamada | 358/260 |
| 4,651,221 | 3/1987 | Yamaguchi | 358/260 |
| 4,675,831 | 6/1987 | Ito et al. | 358/298 |
| 4,698,778 | 10/1987 | Ito et al. | 358/283 |
| 4,827,349 | 5/1989 | Ogata et al. | 358/256 |
| 4,829,385 | 5/1989 | Takezawa | 358/260 |
| 4,868,884 | 9/1989 | Miyazaki et al. | 382/30 |
| 4,876,609 | 10/1989 | Ogura | 358/443 |
| 4,922,349 | 5/1990 | Abe et al. | 358/443 |
| 4,959,769 | 9/1990 | Cooper et al. | 364/200 |
| 4,996,679 | 2/1991 | Yoshio | 369/33 |
| 5,086,434 | 2/1992 | Abe et al. | 358/450 |
| 5,113,492 | 5/1992 | Ariki et al. | 395/147 |
| 5,204,946 | 4/1993 | Shimamura | 395/146 |
| 5,220,648 | 6/1993 | Sato | 395/146 |
| 5,231,676 | 7/1993 | Mahoney | 382/22 |
| 5,258,998 | 11/1993 | Koide | 358/433 X |
| 5,270,805 | 12/1993 | Abe et al. | 358/500 |
| 5,293,232 | 3/1994 | Seki et al. | 358/715 |

FOREIGN PATENT DOCUMENTS 61-252740A 11/1986 Japan .

*Primary Examiner*—Paul Ip
*Attorney, Agent, or Firm*—Finnegan, Henderson, Farabow, Garrett & Dunner

[57] ABSTRACT

A data transmitting apparatus capable of performing highly efficient transmission of data in mixed mode. The data transmitting apparatus comprises an image data block detector for detecting a block composed of image data out of blocks forming a document stored in a picture image memory, and a vacant space detector for detecting a vacant space in excess of a predetermined size in the block detected by the image data block detector, the block being divided into two blocks which are formed by the vacant space and the remaining space, respectively, when the vacant space is detected by the vacant space detector. The data transmitting apparatus is advantageous of transmitting the entire document in a shorter period of time.

5 Claims, 7 Drawing Sheets

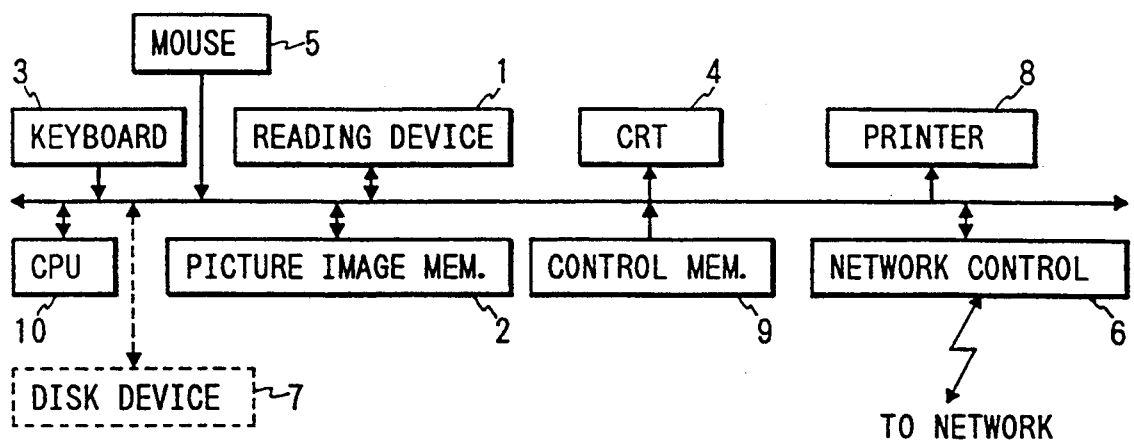
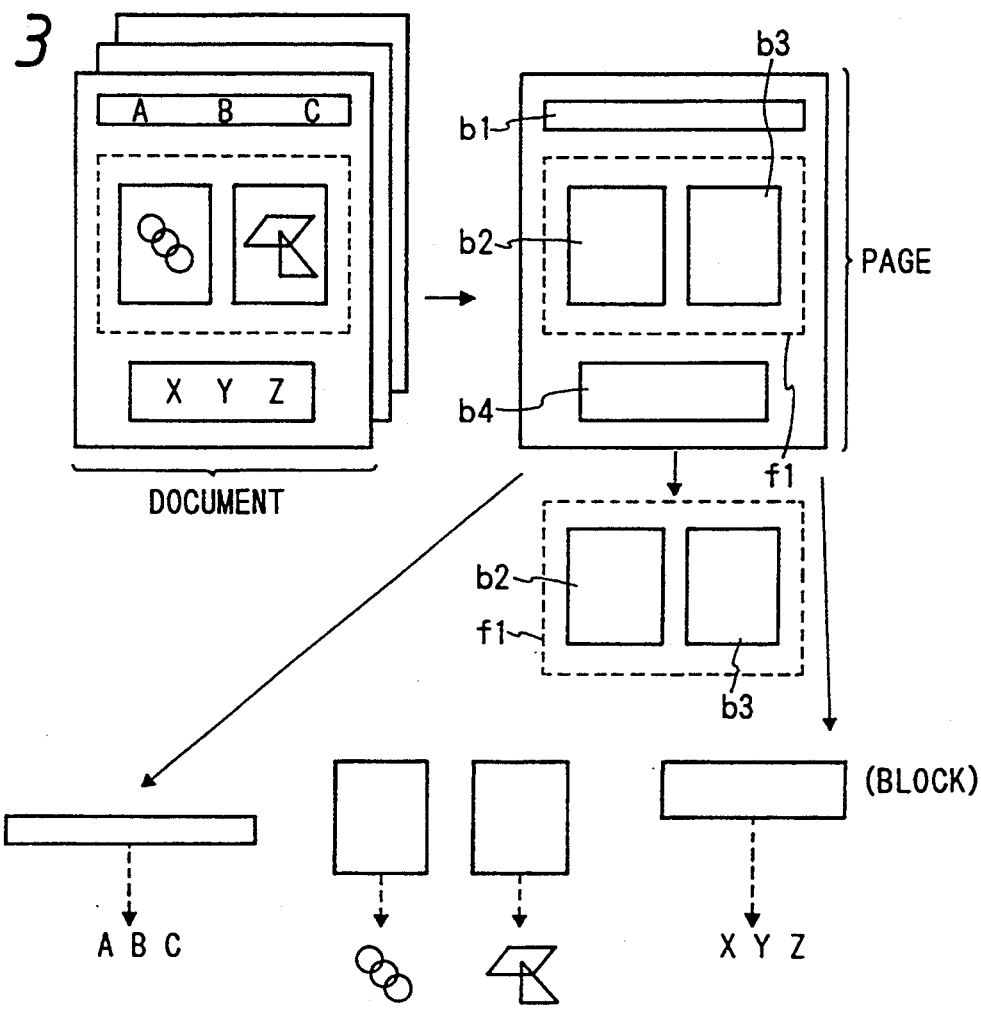

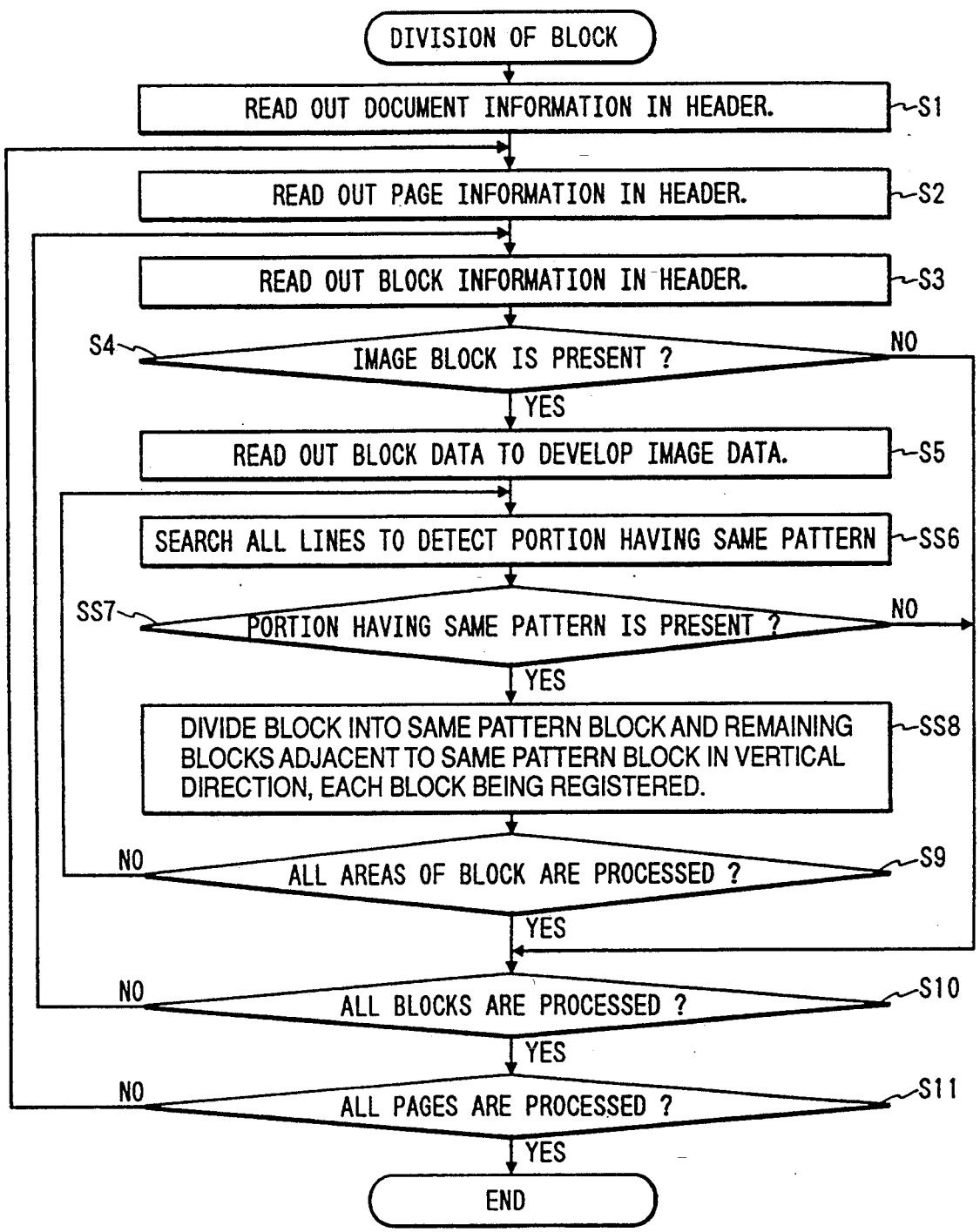

FIG. 5
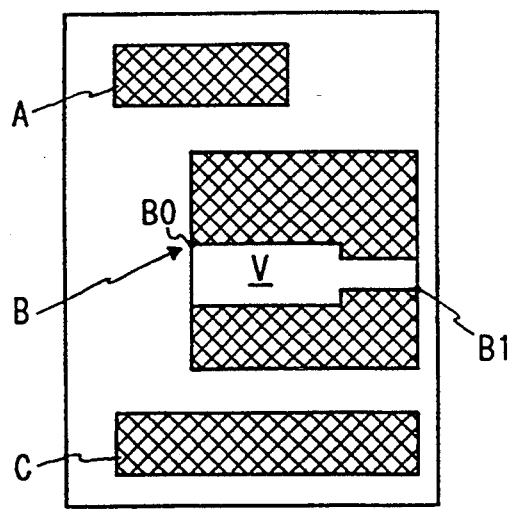
FIG. 6
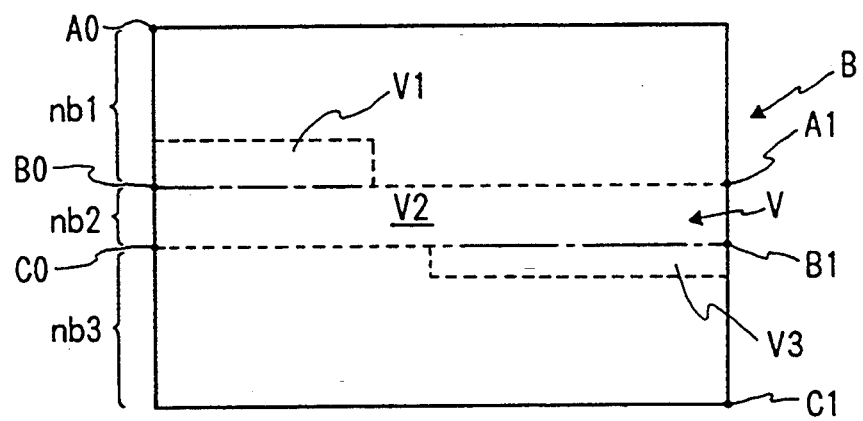
FIG. 7
```
ABCXEROX ---------------------- BEST
XYZFAX ------------------------ ⓒⓇ
ⓒⓇ
ⓒⓇ
ⓒⓇ
**FFF ------------------------- (YY)
GHIJK ------------------------- END.
```

DATA TRANSMITTING APPARATUS

BACKGROUND OF THE INVENTION

1. Field of the Invention

The present invention relates to a data transmitting apparatus, and more particularly to a data transmitting apparatus which is capable of efficiently transmitting data in a mixed mode.

2. Description of the Related Art

There have been proposed various communication systems for document data, one being a system such as a telex in which a document composed entirely of characters are encoded into character data to transmit such a document in a highly efficient manner, and the other being such a system as a facsimile capable of transmitting a document containing an arbitrarily selected picture image data which cannot be encoded by the above-mentioned character encoding system.

The two systems mentioned above are different from each other in the encoding processes, and yet have some common features. For example, a protocol system is used in both a facsimile and a telex in the Group 4 (G4) category. As the result of such a common feature, a mixed mode communication system, which integrates these two processes, has come to be realized. With such a mixed mode communication system, it is possible to perform highly efficient transmission of documents which contain image data and character data in a mixture.

That is to say, it would take a long transmitting time to make an attempt at transmitting a document entirely in the form of picture image data because such a process would involve a larger amount of data, but a mixture of character data which can be transmitted in a set of codes for each character will be able to attain a reduction of the amount of data to be transmitted and therefore a reduction of the transmitting time as compared with a case in which the entire document is transmitted uniformly as picture image data.

In this regard, the G4 facsimile mentioned above is available in Class 1, which can transmit and receive only picture image data, Class 2, which can receive character data in addition to the transmission and reception of picture image data, and Class 3, which can transmit and receive both picture image data and character data.

Therefore, even communications between G4 facsimile units may fail in transmitting character data in some cases in which the receiving facsimile unit, for example, has only the functions of Class 1.

In an effort to deal properly with a trouble like this, the apparatus which is described in Published Unexamined Japanese Patent Application No. sho-61-252740 published in 1986 is designed to be capable of converting character data to picture image data to be transmitted to the receiving station having no capability of displaying or printing a document on the basis of received character data (this capability is hereinafter referred to as "the receiving capability").

As described above, there is some problem in the communication in the mixed mode that the process still takes a longer communication time than in the transmission of character data only, though it can certainly reduce the communication time and that particularly in case there are many vacant spaces in the image data part, also such vacant spaces are transmitted as a part of the picture image data, with the result that much wasteful communication time has to be spent.

Now, this problem will be shown specifically with reference to an example of a document shown in FIG. 5. A single page of this document is composed of three blocks A, B and C. Of these, the blocks A and C are blocks composed of character data while the block B is a block composed of picture image data.

At this point, attention is paid to the block B, which contains image data, and it is observed that a large vacant space V is present in the central part of the block B. In spite of the fact that there is such a vacant space in it, the block B which represents picture information read with a reading device as a coherent set of figures and tables and pictures, is stored in the memory as continuous image data including the vacant space V from a start point B0 to a termination point B1. Accordingly, wasteful time would be needed for the communication of the image data thus containing such vacant spaces.

In such conventional communications of data in a mixed mode, such wastefulness as this still remains without any improvement made upon it.

SUMMARY OF THE INVENTION

In view of the above, an object of the present invention is to overcome the problem accompanying the conventional system which has been described above and to provide a data transmitting apparatus which is capable of performing highly efficient transmission of documents in the mixed mode without ever transmitting any such part as the vacant space mentioned above as redundant picture image data.

According to the present invention, the above, and other objects of the invention are met by the provision of a data transmitting apparatus capable of transmitting data in a mixed mode to a remote data receiving station, which comprises an image data block detecting means for detecting a block composed of image data out of blocks forming a document stored in a picture image memory means, and a vacant space detecting means for detecting a vacant space in excess of a predetermined size in the block detected by the image data block detecting means, the block being divided into two blocks which are formed by the vacant space and the remaining space, respectively, when the vacant space is detected by the vacant space detecting means.

The above and other objects of the invention are accomplished by the following modifications without departing from essential concept of the present invention:

A data transmitting apparatus capable of transmitting data in a mixed mode to a remote data receiving station comprising a character data block detecting means for detecting a block composed of character data out of the blocks forming a document stored in a picture image memory means, and a vacant space detecting means for detecting carriage return codes in excess of a predetermined number, which represents a vacant space in the block detected by the character data block detecting means, the block being divided into two blocks which are formed by the vacant space and the remaining space, respectively, when the vacant space is detected by the vacant space detecting means; and A data transmitting apparatus capable of transmitting data in a mixed mode to a remote data receiving station, comprising an image data block detecting means for detecting a block composed of image data out of blocks forming a document stored in a picture image memory means, a repeating portion detecting means for detecting a portion in the block detected by the image data block detecting means, the portion being formed with line data having the same pattern which occurs repeatedly, and a dividing means for dividing the block into one block composed of the detected portion and another block composed of the remaining portion in the detected block.

The present invention, which has the characteristic features described above, is capable of dividing a single existing block into a plural number of block parts at the position of a vacant space in excess of a predetermined size as the boundary and additionally deleting such a vacant space or replacing the above-mentioned vacant space with particular character data along with such a division, and therefore capable of achieving a considerable reduction of the amount of data.

BRIEF DESCRIPTION OF THE DRAWINGS

The accompanying drawings, which are incorporated in and constitute a part of the specification, illustrated presently preferred embodiments of the invention and, together with the general description given above and the detailed description of the preferred embodiments given below, serve to explain the principles of the invention. In the accompanying drawings:

FIG. 2 is a block diagram illustrating the hardware construction of a facsimile apparatus;

FIG. 3 is a chart showing one example of document structure;

FIGS. 4(a) to 4(d) are flow charts each showing the operations of the example of preferred embodiments described herein;

FIG. 5 is a schematic diagram illustrating an example of data in a mixed mode;

FIG. 6 is a schematic diagram illustrating an example of the structure of a block composed of image data; and FIG. 7 is a schematic diagram illustrating an example of the structure of a block composed of character data.

DESCRIPTION OF THE PREFERRED EMBODIMENT

Figure 1:
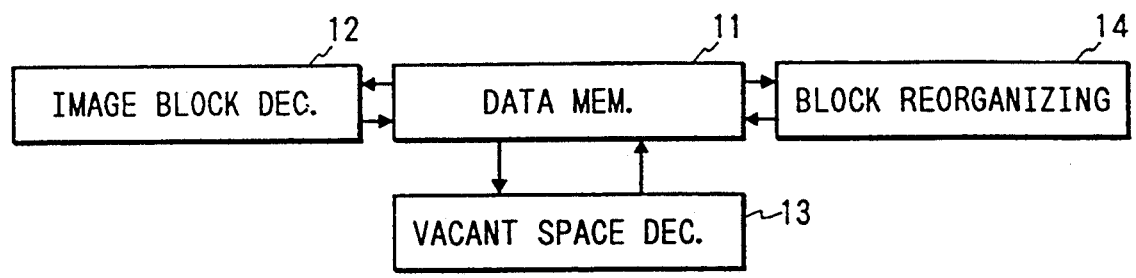
FIG. 1 is a block diagram illustrating the principal functions performed by a facsimile apparatus.

Now, a detailed description will be made of the present invention with reference to the accompanying drawings, in which like reference characters designate like or corresponding parts throughout the several drawings.

In the description to follow, a preferred embodiment of the present invention will be used as an example. It should be understood, however, that the present invention is not limited to the example of embodiment, but may be applied effectively to other forms of its embodiment to such an extent as will not deviate from the technical scope defined for the present invention.

FIG. 2 is a block diagram illustrating the hardware construction of a facsimile apparatus presented here as an example embodiment of the present invention. As shown in this Figure, the picture information read from the original sheet by means of a reading device 1 is stored as picture image data in a picture image memory 2. Moreover, such information as characters, numerals, symbols and so forth entered by operations on a keyboard 3 is stored as prescribed character code, namely, character data, in the picture image memory 2. The picture information stored in the picture image memory 2 is put on display on the cathode ray tube (CRT) 4, and, with reference to the information thus displayed on this CRT 4, such editorial jobs as deletion, insertion, enlargement, and reduction of picture image are carried out by operations performed on the keyboard 3 or by operating a mouse 5. The edited picture information can be stored as necessary in a disk device 7 provided to the apparatus.

The picture image data included in the edited picture information are compressed by an appropriate encoding means and are then sent out to the communication line, while the character data are sent out as they are to the communication line, through a communication line control unit 6, connected to the receiving station. Also, the picture information received by the particular facsimile apparatus is temporarily stored in the picture image memory 2 so as to output through a printer 8.

Moreover, the received picture information is also displayed on the CRT 4 to be edited thereon before the information is printed out by the printer 8. With operations performed in this manner, this data transmitting apparatus is capable of printing not merely the picture information as received, but also the picture information as edited at discretion.

The individual component elements mentioned above are controlled by a Central Processing Unit (CPU) 10 in accordance with programs and control data which are stored in advance in a control memory 9.

In this example of a preferred embodiment, the picture information displayed on the CRT 4 and edited has a structure illustrated in FIG. 3, and this structure is in accordance with a recommendation given by the C.C.I.T.T.

In the document structure shown in FIG. 3, the individual pages of a document composed of a plural number of pages are formed of a plural number of blocks, namely, b1 through b4, and also the blocks b2 and b3 together form a frame f1. The frame f1 and the blocks b1 through b4 mentioned above are respectively defined in terms of a rectangular region having a side parallel with a side of the page.

In this manner, a document can be decomposed into pages, frames, blocks, and text contents. Then, the position of each block or a frame, namely, each object, has its starting point defined for each such object on a system of coordinates in the fourth quadrant having its point of origin at a point in the upper left part of the page. Each such object has its position determined in its relation to an object at a level higher by one step than its own level, for example, a block in relation to a frame.

Each page, each frame, and each block have a header showing the attributes of the particular block in addition to its text contents. The particulars of a header contain identifiers, which respectively identify the page, the frame, and the block, coordinates indicating the position of a frame and a block, information on the size, the information indicating whether or not the data are character data, and so forth.

Next, the operations to be performed with this example of a preferred embodiment when a document having a document structure described above is to be transmitted with a facsimile apparatus with its hardware constructed in the manner described above, will be described with reference FIG. 4 which is a flow chart showing the operations of this example of embodiment of the present invention.

Figures 4A, 4B:
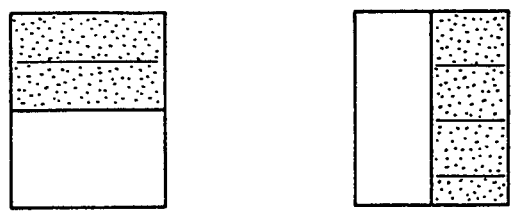
FIGS. 4(A) to 4(D) are schematic diagrams illustrating first to fourth examples of data structures, respectively.

FIG. 4(A) is a schematic diagram illustrating a first example of the document structure, and FIG. 4(a) is a flow chart showing the processing for the document shown in FIG. 4(A). As shown in FIG. 4(a), the system in the data transmitting apparatus first reads at the step S1 header information of the document, and then reads at the step S2 header information of page contained in the document. Thereafter, header information of a block is read out at the step S3. According to the header information, it is determined whether the block is composed of picture image data or not at the following step S4. If the block contains the picture image data, the actual image data is read out from a file to be developed at the step S5.

At the step S6, the system determines whether any vacant space is present or absent on the basis of the point whether white pixels are present in continuum in excess of a predetermined reference number of lines, 20 lines for instance. It is detected at the step S7 whether white pixels are found to be present in excess of such a reference number of lines, i.e., in case there is any vacant space, the system will proceed to the step S8 where the header informations of the document, page and block are changed accordingly, and the image data contained in the page is divided into two blocks, the former containing the image data preceding the vacant space and the latter containing the same following the vacant space. Then, the data as to the two blocks are registered in the file. The operation of the step S8 is successively carried out over the entire block at the step S9. Further, the same operation is successively carried out over all blocks in the same page at the step S10, and over the all blocks in the document at the step S11.

On the occasion of such a division of a block, the system will perform a processing operation as determined in advance out of the processes of simply deleting such a vacant space as mentioned above and, alternatively, replacing such a vacant space with character data.

The reference number of lines for the detection of a vacant space as mentioned above is set in such a manner that the total amount of data of the block including its header information will not be any larger when a block is formed, for example, by replacing such a vacant space with character data. The reason is that a reduction of the amount of data cannot be attained even if too small a vacant space is formed into a new block when also the header information is included in the new block.

However, in the case where the system selects the process of deleting a vacant space as mentioned above, it will be sufficient that the reference number of lines mentioned above is small because the process does not involve the formation of any new block. In such a case, the reference number of lines can be determined in consideration of the complexity of the processing operations as viewed in relation to the amount of data to be deleted.

While the block is divided in a vertical direction of page or block in the above described example, the block may be divided in a horizontal direction thereof, that is, into right side block and left side block as shown in FIG. 4(B). FIG. 4(b) is a flow chart showing an example of dividing the block in the horizontal direction, which is substantially same as that of FIG. 4(A). In FIG. 4(b), the same steps bear the same reference characters, respectively.

In the step S4 of FIG. 4(b), if it is determined that the block is composed of picture image data, the actual image data is read out from a file to be developed so that all lines are subjected to logical summation processing in the step S50. With regard to line data which is obtained by the logical summation processing in the step S50, it is detected whether there is a vacant space composed of white bits in the following step S60. Thereafter, it is detected in the step S7 that there is the vacant space in the block when white pixels not less than 50 bits appears continuously. If yes in the step S7, the block is divided into two blocks of right and left sides in the horizontal direction. More concretely, the header data of the respective document, page block are modified or corrected, and the actual image data of the block is divided into the two blocks to be registered in the file.

In the above described step S50, it is possible to detect a space composed of lines having the same pattern by subjecting the data to an exclusive logical summation processing. In this case, the block is divided into two blocks, so that one of the two blocks is formed by the space composed of the same pattern lines. The data as to these new two blocks or more are registered in the file. In this case, the pattern data as to the divided block composed of the same pattern lines is replaced with a pattern data representing the pattern of a line which occurs repeatedly. It may be allowed to add to the header of the block a flag indicating that the block is composed of lines each having the same pattern.

Figure 4C:
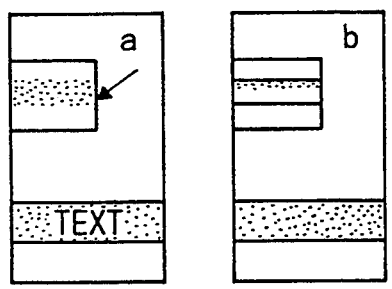
Figure 4D:
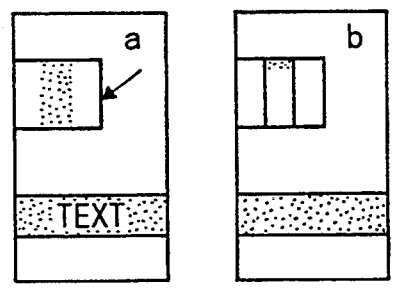
Figure 4A:
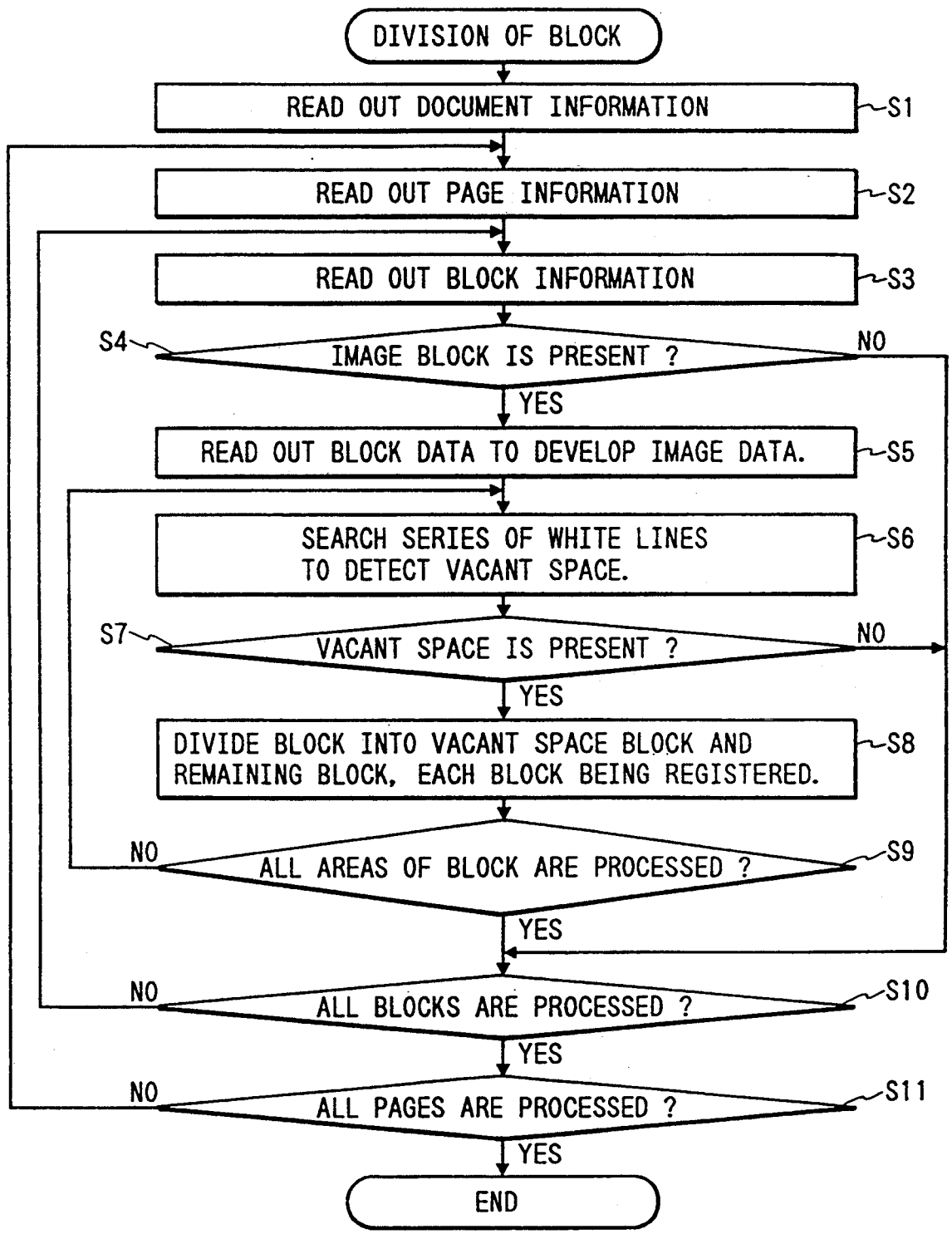
Figure 4B:
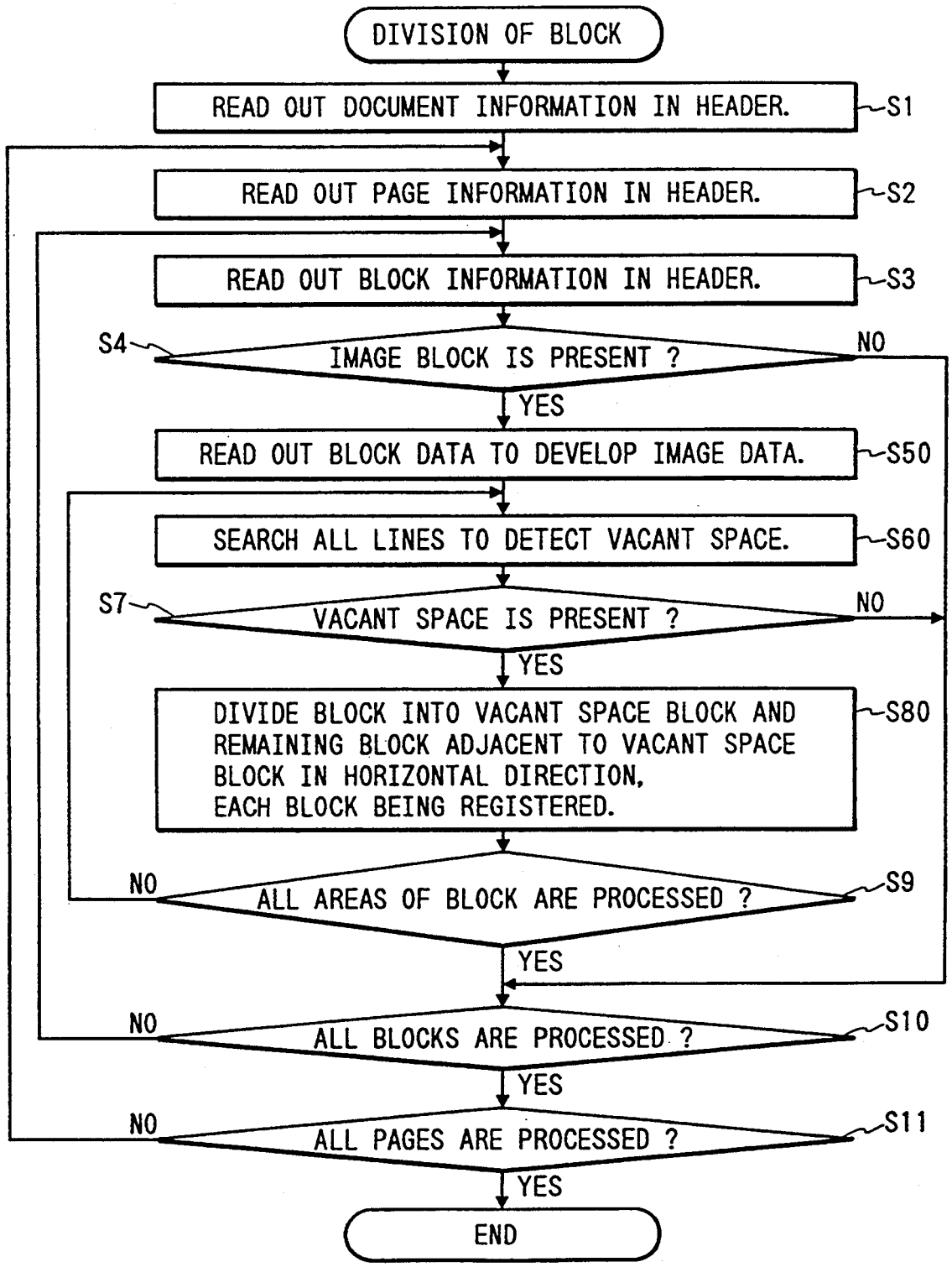
Figure 4D:
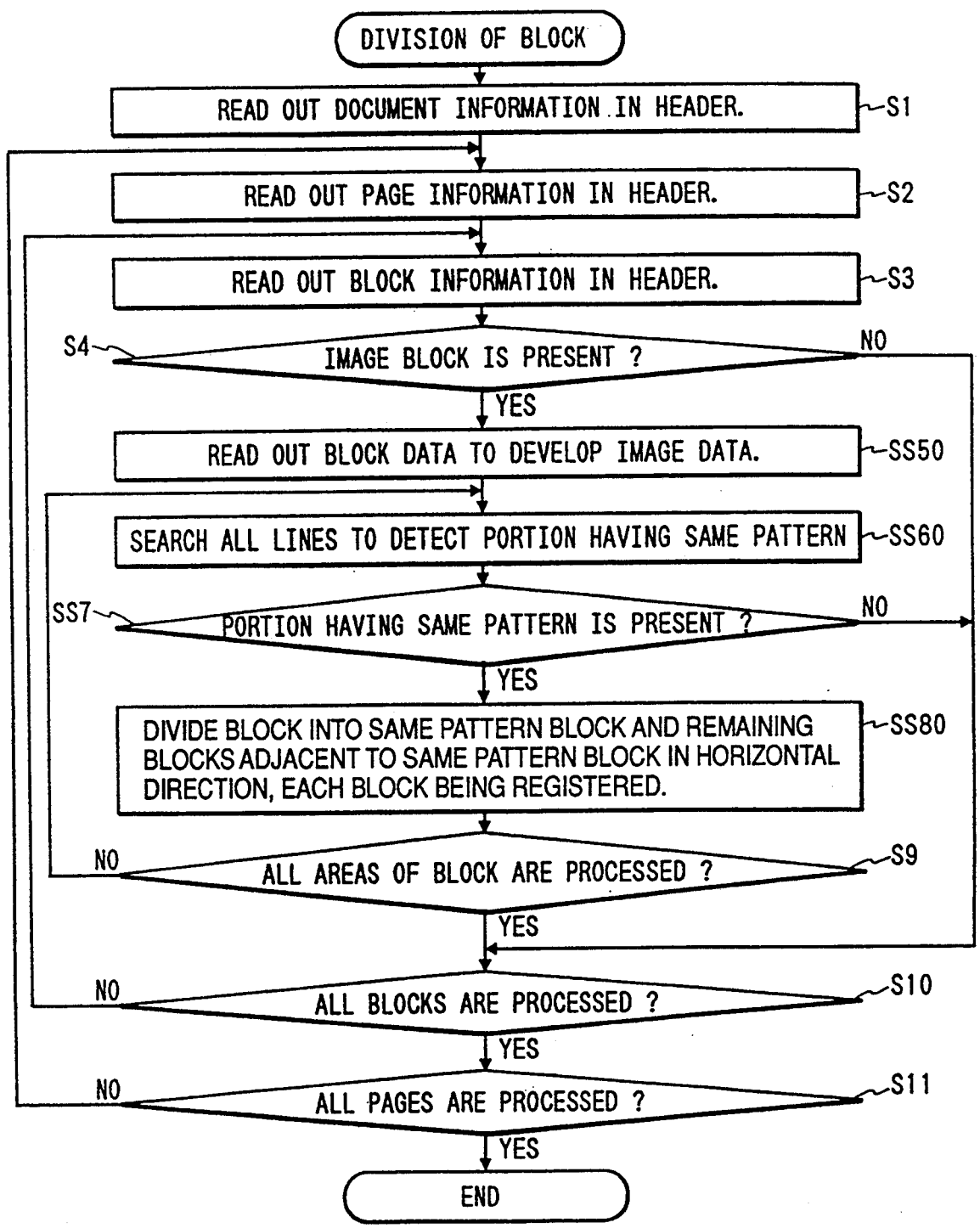

As is clear from FIGS. 4(A) to 4(D), the third example of data structure of FIG. 4(C) is a modification of the first example shown in FIG. 4(A), whereas the fourth example of data structure of FIG. 4(D) is a modification of the second example shown in FIG. 4(B). In FIG. 4(c), the steps S1 to S5 are substantially the same as those of FIG. 4(a).

At the step SS6, the system determines whether any portion having the same pattern is present or absent on the basis of the point whether the lines having the same pattern are present in continuum in excess of a predetermined reference number of lines, 20 lines for instance. It is detected at the step SS7 whether the portion having the same pattern is found to be present in excess of such a reference number of lines, the system will proceed to the step SS8 where the header informations of the document, page and block are changed accordingly, and the image data contained in the block is divided into plural blocks as indicated by "b" in FIG. 4(C).

More specifically, the division of a block is carried out in such a manner that the block is divided into three portions as indicated by "b" in FIG. 4(C) when a shaded portion is of the same pattern and only one line contained in the shaded block is stored. It may be allowed to add to the header of the block information a flag indicating that the block is composed of the lines having the same pattern.

The data process at a receiver side when the block data having the same patter is replaced by one line data having the same pattern will be described. One example of such a receiver is provided with a comparator for comparing the quantity of data for the block with data as to the size of block which is determined by the coordinate data of block. If the comparator detects that the quantity of data for the block is insufficient to fill the block, the preceding line data is reproduced repeatedly to fill the block. In the case where the flag indicating that the block is composed of the lines each having the same pattern is added to the header of the block, when the receiver detects such a flag, the same reproduction of the preceding line is repeatedly carried out.

Alternatively, devices for the receiver side such as a receiver, an output unit for the receiver and the like may be adapted to have a function for selecting one of the operations.

If the number of lines for the block is less than the block size,
1. an empty area of the block is filled according to data as to the last line in the block;
2. the remaining space of the block is regarded as being a vacant space or the remaining space thereof is reproduced according to data as to background data; and
3. the data is regarded as being data containing error information.

Assuming that a data transmitter is adapted to add the above described flag to the header of the block, the receiver is also adapted to reproduce repeatedly the data representing the line data occurring immediately before to complete the reproduction of the block.

Then, the data as to the plural blocks are registered in the file. The operation of the step SS8 is successively carried out over the entire block at the step S9. Further, the same operation is successively carried out over all blocks in the same page at the step S10, and over the all blocks in the document at the step S11.

While the block is divided in a vertical direction in the third example, the block may be divided in a horizontal direction as shown in FIG. 4(D). FIG. 4(d) is a flow chart showing an example of dividing the block in the horizontal direction, which is substantially the same as that of FIG. 4(c). In FIG. 4(d), the same steps bear the same reference characters, respectively.

In the step S4 of FIG. 4(d), if it is determined that the block is composed of picture image data, the actual image data is read out from a file to be developed so that all lines are subjected to exclusive logical summation processing in the step SS50. With regard to line data which is obtained by the exclusive logical summation processing in the step SS50, it is detected whether there is a portion composed of the same bits on each of lines in the following step SS60. Thereafter, it is detected in the step SS7 that there is the same pattern portion in the block when the same pattern pixels not less than 50 bits appears continuously in the block. If yes in the step SS7, the block is divided into plural blocks in a horizontal direction, three blocks for instance as shown in FIG. 4(D). In FIG. 4(D), a shaded portion is of the same pattern, and thus the block is divided into three blocks. Data representing one line having the same patter is stored as data of lines contained in the shaded block. More concretely, the header data of the respective document, page block are modified or corrected, and the actual image data of the bock is divided into the three blocks to be registered in the file.

Now, the above-mentioned process for dividing a block (at the step S4) will be described in detail with reference to FIG. 6. In FIG. 6, it is observed that the block B has a vacant space V and that this vacant space V is composed of the segments V and V3, in which the white pixels fall short of one line, and a vacant space V2, in which white pixels continue through several lines. The vacant spaces V1 and V3 will not be considered to be any vacant space in the processing operations shown in the flow chart mentioned above because the white pixels in any of these are less than one line.

On the other hand, it will be determined that the vacant space V2 is a vacant space having a size not any smaller than the predetermined size, and this vacant space V2 will therefore be registered as a new block nb2. Furthermore, two blocks nb1 and nb3 will be formed afresh with this block nb2 serving as the boundary. That is to say, the original block B will be replaced with these new blocks nb1 through nb3.

The starting point of the block nb1 is A1, the start point of the block nb2 is B0, and further the starting point of the block nb3 is C0. The terminating point of the block nb3 is C1. The coordinates for these starting points and the terminating point will be stored as the header information in each block.

The block nb2 expresses the white pixels for n-lines between its starting point B0 and its terminating point B1 with n-pieces of character data, for example, with a carriage return code (CR), and the system registers such character data as the text data for the block nb2. When a vacant space is expressed in character data in this manner, a single line (which corresponds to 1,728 bits on a standard A4 size sheet) can be expressed in eight bits.

As one character (font) is composed of a plural number of dots, for example, 24 dots by 24 dots, and, if white pixels appear in continuation through 24 lines, these white pixels can be replaced with a single carriage return (CR) code thereby resulting in a further reduction of the amount of data.

It may also possible to replace entire blocks with either the return code (CR) or a character code representing the vacant space. In this case, the size of block is determined according to the coordinate data of the block and the fact that the block is vacant is determined according to either the return code (CR) or the character code at the receiver side.

However, in the case where the vacant space mentioned above is likely to be processed by editing on the basis of the received data at the side of the receiving station, it will be desirable, in view of the processing operation to be performed at the receiving station side, that the vacant space is also transmitted as important information. Yet, if the document to be transmitted is a document which requires no editing process, the vacant space will not be treated as information. In other words, such a vacant space can be deleted and excluded from the object of transmission.

In this regard, it is possible to construct the data transmitting apparatus in such a manner that the apparatus is provided with a selecting switch or the like, by which the operator is enabled to determine at his discretion whether a given vacant space is to be converted into character data or to be deleted.

Next, the functions of the this example of embodiment will be described with reference to FIG. 1, which presents a block diagram showing the principal functions of a facsimile apparatus.

In FIG. 1, a data memory section 11 stores the picture image read with the reading device 1 mentioned above and the picture information data composed of characters entered by operations on the keyboard. That is to say, the data memory section 11 stores character data, picture image data, and picture information data containing these in mixture. The character data and the image data are respectively formed into different blocks and stored in the data memory section 11.

An image block detecting section 12 reads the header information in each block of the picture information stored in the data memory section 11 mentioned above and detects whether or not the data on the picture information mentioned above contains any block composed of picture image data, namely, any image data block. In the case where there are any image data block, the system feeds a detection signal to the data memory section 11.

Then, the system reads out the data on the picture information, namely, picture image data, in the particular block in response to such a detection signal and, feeding the data to a vacant space detecting section 13. Then, the vacant space detecting section 13 detects the size of the white pixels contained in the picture image data mentioned above, and the detected size of the white pixels is then compared with a predetermined size, for example, a reference number of lines. As a result of the comparison, if any vacant space not smaller than the reference number of lines is found, this block will be transmitted to a block reorganizing section 14 so that the block is reorganized into a block including a block expressed by character data and preceding or following blocks each being composed of picture image data. Then, the reorganized block is stored in the data memory section 11.

With the above described embodiment of the present invention, if a vacant space not smaller than a predetermined size is detected in a clock composed of picture image data, the vacant space is removed or replaced with character data to thereby compress the amount of data.

An example of data compression in a block composed of picture image data has been described hereinbefore, but this example can be applied, almost as it is, also to the data compression in a block composed of character data as shown in FIG. 7.

If carriage return (CR) codes in excess of a predetermined number have been detected in a block composed of character data as shown in FIG. 7, the block is divided into two parts at points respectively preceding and following these carriage return codes, and the part composed of the carriage return (CR) codes in excess of such a predetermined number is deleted.

Also in this case, it is desirable to set the above-mentioned predetermined number on the basis of the estimate whether the deletion of such carriage return (CR) codes will result in the compression of the total amount of data as judged in consideration of an estimated increase of the header information as the result of the division of the block into two parts.

Moreover, this example of embodiment describes the data transmitting apparatus in respect of the transmission of picture information transmitted by a facsimile system, and yet the present invention is not to be limited to the facsimile system, but can be practiced in the same manner in data communications between personal computers and in data communications between work stations.

Therefore, the structure of a document to be taken up for its transmission will not be limited to its structure formed in accordance with a recommendation by the C.C.I.T.T. as described with reference to FIG. 3, and the present invention can be applied to any form of document so long as it is a document organized in such a manner as to distinguish the attributes of a character data part and those of a picture image data part on the basis of some appropriate indicating information, so that it will be possible for the system to perform a conversion of data.

Also, the present invention can attain a further reduction of data by eliminating wasteful vacant spaces in those data which are encoded by various types of encoding systems, such as MH, MR, and MMR, by processing such data in the same manner as described in this example of embodiment.

As it is obvious from the description made hereinabove, the present invention is capable of either deleting a wasteful part of data or replacing such a part of data with character data smaller in terms of the amount of data in case the system determines that a wasteful vacant space is present in a document to be transmitted.

As the result of the operations described above, the data transmitting apparatus according to the present invention is capable of compressing the amount of data in a document containing character data and image data in mixture and thereby reducing the communication time for the transmission of the document.

What is claimed is:

1. A data transmitting apparatus capable of transmitting data in a mixed mode to a remote data receiving station, said data transmitting apparatus comprising:
    an image data block detecting means for detecting a block composed of image data out of blocks forming document data;
    a vacant space detecting means for detecting a vacant space in excess of a predetermined size in the block detected by said image data block detecting means; and
    a dividing means for dividing the block into two blocks separated by the vacant space detected by said vacant space detecting means.

2. The data transmitting apparatus as defined in claim 1 wherein the vacant space is replaced with character data after the division of blocks.

3. A data transmitting apparatus capable of transmitting data in a mixed mode to a remote data receiving station, comprising:
    a character data block detecting means for detecting a block composed of character data out of the blocks forming document data;
    a vacant space detecting means for detecting carriage return codes in excess of a predetermined number, which represents a vacant space in the block detected by said character data block detecting means, and
    a dividing means for dividing the block into two blocks separated by the vacant space detected by said vacant space detecting means.

4. A data transmitting apparatus capable of transmitting data in a mixed mode to a remote data receiving station, comprising:
    an image data block detecting means for detecting a block composed of image data out of blocks forming document data;
    a repeating portion detecting means for detecting a portion having repeated patterns in excess of a predetermined size in the image data block detected by said image data detecting means; and
    a dividing means for dividing the detected image data block into two blocks separated by said portion detected by said repeating portion detecting means.

5. The data transmitting apparatus as defined in claim 4 further comprising a replacing means for replacing said portion detected by said repeating portion detecting means with data representing at least one pattern occurring repeatedly in said portion.

* * * * *